3,847,909
WATER-INSOLUBLE AZLACTONE DYESTUFFS
AND PROCESS FOR PREPARING THEM
Rudolf Schickfluss, Frankfurt am Main, and Willi Steckelberg, Hofheim, Taunus, Germany, assignors to Farbwerk Hoechst Aktiengesellschaft vormals Meister Lucius & Bruning, Frankfurt am Main, Germany
No Drawing. Filed May 24, 1973, Ser. No. 363,416
Claims priority, application Germany, May 26, 1972,
P 22 25 546.5
Int. Cl. C09b 23/00
U.S. Cl. 260—240 F          7 Claims

ABSTRACT OF THE DISCLOSURE

Water insoluble azlactone dyestuffs of the formula

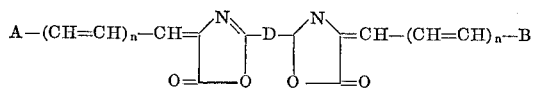

wherein A and B each represent phenyl, lower alkyl-phenylene, lower alkoxy-phenylene, chlorophenylene, bromophenylene, methylenedioxy-phenylene or naphthyl, D represents phenylene, chlorophenylene, bromophenylene, biphenylene or naphthylene, and $n$ represents 0 or 1, said dyestuffs being suitable, individually or in mixture with one another or with dyestuffs of another type, in aqueous dispersion or in solution of an organic solvent, or in an emulsion or in a dispersion which may contain besides an organic solvent also water, for the dyeing or printing of synthetic fibrous materials, such as cellulose- di-, -2½- or triacetate fibres, polyamide, polyurethane polycarbonate and, especially, polyester fibres, the dyeings or prints obtained on said fibres being distinguished by brilliant yellow to orange dyeings of outstanding fastness properties, particularly of good fastness to light and to sublimation.

The present invention relates to novel water-insoluble azlactone dyestuffs of the general formula (1)

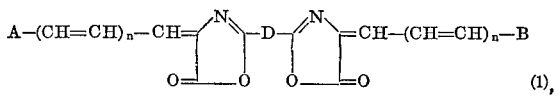

wherein A and B represent identical or different naphthyl radicals and/or phenyl radicals which may be substituted by halogen atoms, alkyl and/or alkoxy groups having 1 to 4 carbon atoms, D represents a biphenylene, naphthylene or phenylene radical which may be substituted by halogen atoms, alkyl and/or alkoxy groups having 1 to 4 carbon atoms, and $n$ represents the integer 0 or 1 and a process for preparing them.

As phenylene radicals for D may be mentioned the 1,4- and the 1,3-phenylene radical, as naphthyl radical for D, the 1,4- and the 2,6-naphthylene radical, as biphenyl radical for D the 4,4'-biphenylene radical. As halogen atoms may be mentioned, for example, chlorine and bromine atoms.

Among the dyestuffs of the formula (1) may be pointed out the dyestuffs of the formula (2)

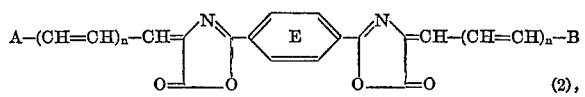

wherein A, B and $n$ are defined as above and the phenylene radical E may be substituted by halogen atoms such as chlorine or bromine atoms, alkyl and/or alkoxy groups having generally 1 to 4 carbon atoms.

Particularly valuable dyestuffs of the formula (1) are those of the formula (3)

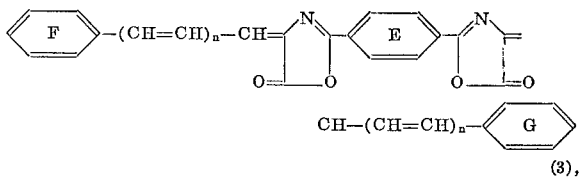

in which $n$ represents the integer 0 or 1 and the phenylene radical E and the phenyl radicals F and G may be substituted by halogen atoms, such as chlorine or bromine, alkyl and/or alkoxy groups having generally 1 to 4 carbon atoms.

The new dyestuffs are prepared in known manner, by condensing aroylbisglycines of the formula (4)

$$HOOC-CH_2-NH-CO-D-CO-NH-CH_2-COOH \quad (4)$$

preferably terephthaloyl bisglycines of the formula (5)

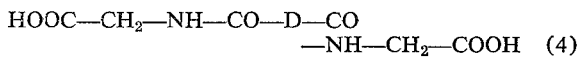

with aldehydes of the formulae $$A-(CH=CH)_n-CHO \quad (6a)$$

and $$B-(CH=CH)_n-CHO \quad (6b)$$

preferably those of the formulae

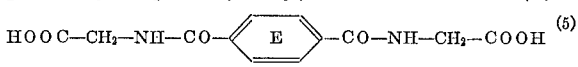

and

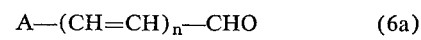

whereby water is split off.

In the formulae (4) to (7) A, B, D, E, F, G and $n$ are defined as above, whereby the meanings of A and B on the one hand, and of F and G on the other hand are generally identical but may also be different from each other.

The condensation is expediently effected in organic solvents, for example in acetanhydride or trifluoroacetic acid anhydride, or in mixtures of solvents, such as mixtures of sulfur trioxide and dimethyl formamide or dioxane and dicyclohexyl-carbodiimide, using an elevated temperature of about 40 to about 200° C., preferably between about 80° C. and about 150° C. The addition of an alkaline agent, for example sodium acetate, potassium hydrogen carbonate, potassium carbonate, pyridine or triethyl amine is often advantageous for the condensation.

Instead of the aroylbisglycines of the formulae (4) and (5) can also be used bisazlactones of the formula (8)

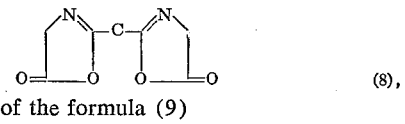

preferably those of the formula (9)

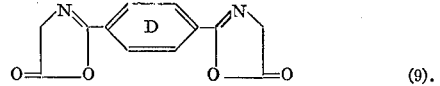

It is generally suitable to react one mol of aroyl bisglycine of the mentioned formula (4) with altogether 2 moles of aldehydes of the formulae (6) and (7). Alternatively, it can be suitable to react the aroyl bisglycine in a smaller molar excess, for example up to about 10%.

The new dyestuffs are used individually or in mixture with one another or in mixture with other dyestuffs, preferably in a prepared form, such as in an aqueous dispersion or in solution with organic solvents or in an emulsion or a dispersion, which may contain also water besides a solvent or a mixture of solvents, and they are suitable for dyeing or printing synthetic fibre materials such as for example fibres of cellulose-di, -2½ and -triacetate, polyamides, polyurethanes, polycarbonates, especially of polyesters such as polyethylene terephthalates.

The above-mentioned synthetic fibre materials used for dyeing or printing may be available in mixtures with one another or with natural fibre materials, such as cellulose fibres or wool. Furthermore, they can be used for dyeing in different states, for example as combined material, flocks, threads, woven or knitted fabrics.

The dyestuffs according to the invention are applied in known manner from an aqueous dispersion, preferably from organic solvents. The dispersion of the dyestuffs can be effected for example by grinding in the presence of a dispersing agent, for example of the condensation product of formaldehyde and naphthalene sulfonic acid.

Moreover, the dyeing conditions depend to a large extent on the type of the synthetic fibre materials available and on the state of manufacture thereof.

For example, shaped articles of cellulose acetate are dyed in a range of temperature of from 75° to 85° C. Cellulose triacetate fibers are dyed at temperatures of from about 90° to 125° C. The application of the dyestuffs onto polyamide fibre materials is effected in the temperature range of from about 90° to 120° C.

Fibre materials of polyesters are dyed according to known methods by dyeing the fibre material in the presence of carriers, such as o- or p-phenylphenol, methylnaphthalene or methylsalicylate, at temperatures of about 100° to about 130° C. or preferably without carriers at higher temperatures, for example between about 120° and about 140° C. Alternatively, the dyestuffs may be applied by padding, with or without thickening agents, for example with a tragacanth thickening and fixed by the action of heat, for example by steam or dry heat for about half a minute to 30 minutes at temperatures of from about 100° to 230° C. To improve the fastness to rubbing, the material thus dyed is expediently freed from the dyestuff attached to the surface, for example by rinsing or by a reductive after-treatment. This after-treatment is generally effected at 60° to 120° C. in a bath which contains aqueous sodium hydroxide solution, sodium dithionite and a non-ionogene detergent, for example an addition product of ethylene oxide and phenol.

The dyeing of the synthetic fibre materials from organic solvents may be effected as follows: the dyestuff exhausts on to the fibre from the solution at room temperature or above room temperature, preferably at about 70° C. to 130° C., if desired, under pressure. The solvents used for the exhaustion process are for example solvents not miscible with water with boiling points of from 40° to 170° C., such as the aliphatic halogenated hydrocarbons, such as methylene chloride, trichloroethane, trichloroethylene, perchloroethylene or trifluorotrichloroethane. The solvents may also be employed in mixture with one another and contain further auxiliaries miscible in solvents, such as oxalkylation products of fatty alcohols, alkyl phenols and fatty acids.

For producing prints on the synthetic fibre materials, for example of polyesters, the dyestuffs according to the invention may be applied in the form of aqueous preparations, which contain besides the finely divided dyestuff suitable thickening agents and agents that assist fixation. The dyestuffs are fixed for example after printing and drying by steaming at atmospheric pressure or under elevated pressure up to 2.5 atmospheres gauge for 10 to 60 minutes.

The dyestuffs may also be fixed by the action of hot air of 160° to 210° C. for 30 seconds for up to 10 minutes.

In this way brilliant yellow to orange dyeings of excellent fastnesses for example to light and to sublimation may be achieved with the new dyestuffs.

The following Examples illustrate the invention.

EXAMPLE 1

30.8 g. (0.11 mol) of terephthaloyl bisglycine and 27.2 g. (0.2 mol) of 4-methoxybenzaldehyde were refluxed in 80 ml. of acetanhydride for 90 minutes while adding 4 g. of sodium acetate (anhydrous) and brought to boil. 120 ml. of water were added to the thick reaction mixture. At about 80° C. the mixture was stirred for 15 minutes. Subsequently the warm suspension was suction-filtered and washed with 250 ml. of water heated to 80° C. Then the dyestuff which corresponds to the formula

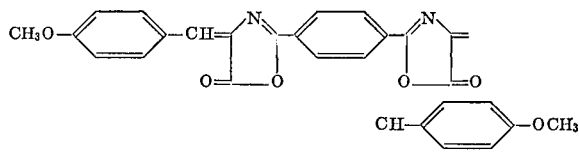

was dried at about 70° C.

38.4 g. of a yellow powder was obtained which yields on polyester fibres a brilliant yellow dyeing having a good to very good fastness to light and a good fastness to sublimation.

Intense yellow prints are also obtained with the dyestuff on cellulose acetate and cellulose triacetate fibre materials.

When dyeing the dyestuff from perchloroethylene according to the exhaustion process, a brilliant yellow dyeing having excellent fastness properties on polyester fibres is obtained.

EXAMPLE 2

30.8 g. (0.11 mol) of terephthaloyl bisglycine, 24.0 g. (0.2 mol) of 4-methylbenzaldehyde, 80 ml. of acetanhydride and 6 g. of potassium hydrogen carbonate were heated to the boil for 90 minutes while stirring. After a short time the reaction mixture started to thicken. Then 100 ml. of water heated at this temperature for about 15 minutes. Then the warm suspension was suction-filtered and the residue was thoroughly washed with 250 ml. of water heated to 80° C. The dyestuff which was obtained as a yellow product and corresponds to the formula

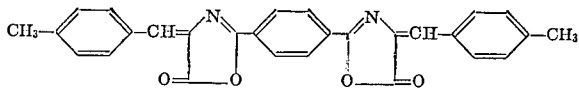

was dried at 70° C. in the vacuum drier. 33.6 g. were obtained. A brilliant greenish yellow dyeing of good fastnesses to light and to sublimation was obtained with this dyestuff on polyester fibres.

EXAMPLE 3

30.8 g. (0.11 mol) of terephthaloyl bisglycine, 26.4 g. (0.2 mol) of cinnamon aldehyde, 80 ml. of acetanhydride and 6 g. of sodium acetate (anhydrous) were heated to the boil for 90 minutes while stirring. The mixture was worked up as described in Example 1, and 36.8 g. of a brownish orange dyestuff of the formula

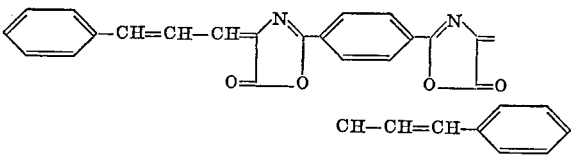

were obtained. Brilliant orange shades of good fastnesses to light and to sublimation were obtained with this dyestuff on polyester fibre materials.

EXAMPLE 4

30.8 g. (0.11 mol) of terephthaloyl bisglycine, 30.0 g. (0.2 mol) of 3,4-methylene-dioxybenzaldehyde, 80 ml. of acetanhydride and 6 g. of sodium acetate (anhydrous) were heated for 90 minutes to 110° C. while stirring. The mixture was worked up as described in Example 2, and 39.6 g. of a brown dyestuff of the formula

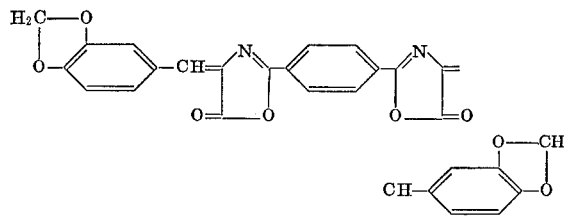

were obtained. The dyestuff yielded on polyester fibre materials yellow orange dyeings of good fastnesses to light and to sublimation.

EXAMPLE 5

30.8 g. (0.11 mol) of terephthaloylbisglycine, 13.6 g. (0.1 mol) of 4-methoxybenzaldehyde and 12.0 g. (0.1 mol) of 4-methylbenzaldehyde were heated in 100 ml. of acetanhydride to 110° C. while stirring for 90 minutes, with addition of 8 g. of sodium acetate (anhydrous). Then the thickened reaction mixture was cooled to 80° C. and mixed with 160 ml. of water heated to 80° C. and stirring was continued fo 15 minutes. The warm suspension was suction-filtered and washed with 250 ml. of water heated to 80° C. Then the dyestuff mixture was dried at about 70° C.; it consisted of three dyestuffs of the following formulae:

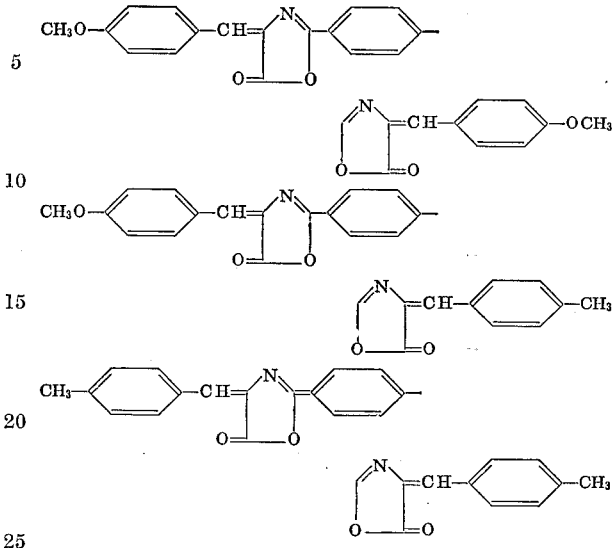

A yellowish brown powder was obtained which yielded on polyester fibres a fast brilliant greenish yellow dyeing.

The following Table lists further dyestuffs which can be prepared according to the processes indicated above and which are characterized by the shades indicated on polyester fibres.

| Example | | Shade |
|---|---|---|
| 6 | 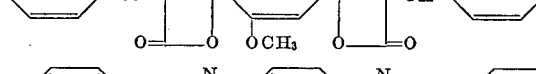 | Yellow. |
| 7 | 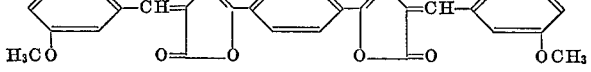 | Greenish yellow. |
| 8 | 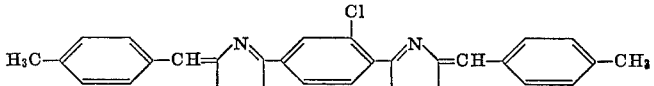 | Do. |
| 9 | 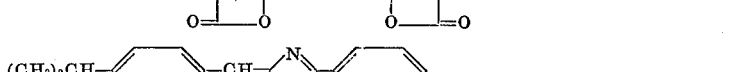 | Do. |
| 10 | 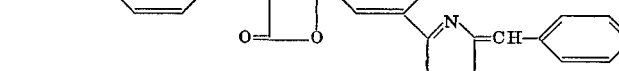 | Do. |
| 11 | 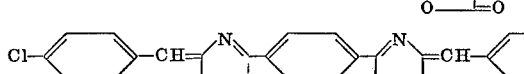 | Do. |
| 12 | 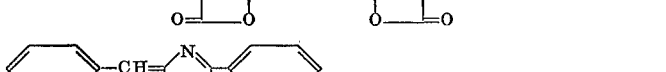 | Do. |
| 13 | 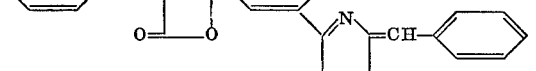 | Do. |

| Example | Structure | Shade |
|---|---|---|
| 14 | Br-C₆H₄-CH=N-(oxazolone)-C₆H₄-(oxazolone)=CH-C₆H₄-Br | Greenish yellow. |
| 15 | C₆H₅-CH=CH-CH=(oxazolone)-C₆H₄-(oxazolone)=CH-CH=CH-C₆H₅ | Do. |
| 16 | (3-H₃CO-C₆H₄)-CH=(oxazolone)-C₆H₄-(oxazolone)=CH-(C₆H₄-OCH₃) | Do. |
| 17 | (naphthyl)-CH=(oxazolone)-C₆H₄-(oxazolone)=CH-(naphthyl) | Reddish yellow. |
| 18 | H₇C₃O-C₆H₄-CH=(oxazolone)-C₆H₄-(oxazolone)=CH-C₆H₄-OC₃H₇ | Yellow. |
| 19 | C₂H₅O-C₆H₄-CH=(oxazolone)-C₆H₄-(oxazolone)=CH-C₆H₄-OC₂H₅ | Do. |
| 20 | H₃CO-C₆H₄-CH=(oxazolone)-C₆H₃(Cl)-(oxazolone)=CH-C₆H₄-OCH₃ | Greenish yellow. |
| 21 | Br-C₆H₄-CH=(oxazolone)-C₆H₂(OCH₃)₂-(oxazolone)=CH-C₆H₄-Br | Do. |
| 22 | C₂H₅-C₆H₄-CH=(oxazolone)-C₆H₄-(oxazolone)=CH-C₆H₄-C₂H₅ | Do. |
| 23 | (naphthyl)-CH=(oxazolone)-C₆H₂(OCH₃)₂-(oxazolone)=CH-(naphthyl) | Orange. |
| 24 | (methylenedioxyphenyl)-CH=(oxazolone)-C₆H₃(Cl)-(oxazolone)=CH-(methylenedioxyphenyl) | Reddish yellow. |
| 25 | C₃H₇-C₆H₄-CH=(oxazolone)-C₆H₂(OCH₃)₂-(oxazolone)=CH-C₆H₄-C₃H₇ | Yellow. |
| 26 | CH₃O-C₆H₄-CH=(oxazolone)-C₆H₄-C₆H₄-(oxazolone)=CH-C₆H₄-OCH₃ | Greenish yellow. |
| 27 | CH₃-C₆H₄-CH=(oxazolone)-(naphthylene)-(oxazolone)=CH-C₆H₄-CH₃ | Yellow. |

TABLE—Continued

| Example | | Shade |
|---|---|---|
| 28 | | Yellow. |
| 29 | | Greenish yellow. |
| 30 | | Yellow. |
| 31 | | Reddish yellow. |
| 32 | | Do. |
| 33 | | Greenish yellow. |

We claim:
1. Water insoluble azlactone dyestuffs of the formula

$$A-(CH=CH)_n-CH\underset{O=\phantom{O}O}{\overset{N}{\diagup\!\!\diagdown}}D\underset{O\phantom{=}O}{\overset{N}{\diagup\!\!\diagdown}}CH-(CH=CH)_n-B$$

wherein A and B each represent phenyl, lower alkyl-phenylene, lower alkoxy-phenylene, chlorophenylene, bromophenylene, methylenedioxy- phenylene or naphthyl, D represents phenylene, chlorophenylene, bromophenylene, biphenylene or naphthylene, and $n$ represents 0 or 1.

2. The dyestuff of the formula

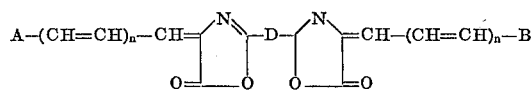

3. The dyestuff of the formula

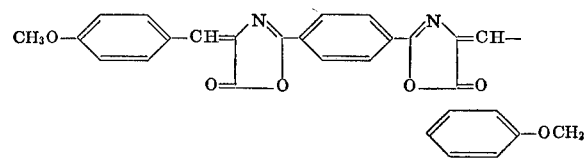

4. The dyestuff of the formula

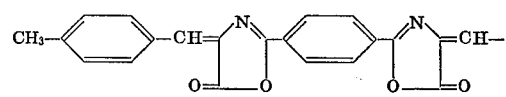

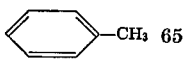

5. The dyestuff of the formula

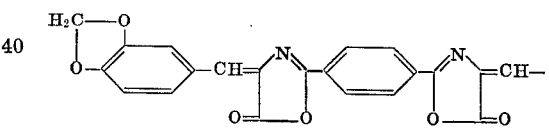

6. The dyestuff of the formula

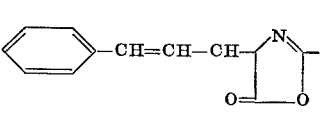

7. The dyestuff of the formula

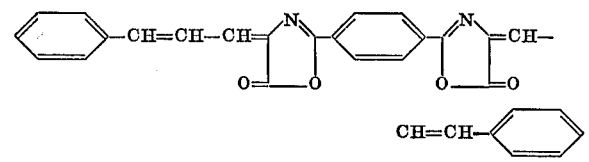

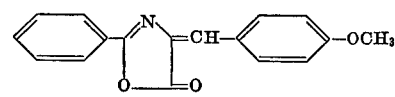

(References on following page)

References Cited

UNITED STATES PATENTS 3,449,329    6/1969    Wildi    260—240.1

FOREIGN PATENTS 2,031,133    12/1971    Germany    260—240 F
2,059,291    6/1972    Germany    260—240 CA

OTHER REFERENCES

Khripak et al., Ukr. Khim. Zh. vol. 30, pp. 618–619 (1964).

Acheson et al., J. Chem. Soc. 1960, p. 3458.

Mustafa, J. Org. Chem., vol. 27, pp. 2406 to 2611 (1962).

Nedilein et al., Chem. Ber., vol. 100, pp. 698 to 700 (1967).

JOHN D. RANDOLPH, Primary Examiner

U.S. Cl. X.R.

8—63, 162 R, 178 E, 178 R, 179